United States Patent [19]

Smith

[11] 3,934,076

[45] Jan. 20, 1976

[54] MOISTURE PROOF CABLE SPLICE ENCLOSURE

[75] Inventor: Donald J. Smith, Woodland Hills, Calif.

[73] Assignee: Smith-Schrerer & Assoc., Inc., Woodland Hills, Calif.

[22] Filed: Nov. 17, 1972

[21] Appl. No.: 307,593

Related U.S. Application Data

[63] Continuation-in-part of Ser. No. 171,570, Aug. 13, 1971, abandoned.

[52] U.S. Cl. ................ 174/87; 174/76; 174/138 F; 339/107

[51] Int. Cl.² ........................................ H02G 15/08

[58] Field of Search ..................... 174/87, 91–93, 174/76, 77 R, 155, 156, 138 F; 339/107, 209, 138, 141

[56] References Cited
UNITED STATES PATENTS 2,906,810  9/1959  D'Ascoli ........................ 174/93 X Primary Examiner—Darrell L. Clay
Attorney, Agent, or Firm—Lyon & Lyon

[57] ABSTRACT

There is disclosed herein an enclosure for a cable splice that rigidly fixes two or more spliced cables and moisture proofs the splice and exposed cable ends. A pair of mating plug members grasp the cable ends and are then partially immersed in a body of sealant contained in a vial. The plug members include a cap portion which engages the vial and keeps the plug firmly in place. The cap portion may include extended arms which engage threads provided on the vial before the plug members fully close the vial. These arms give mechanical leverage for drawing the plug members into a fully closed position in the vial.

11 Claims, 11 Drawing Figures

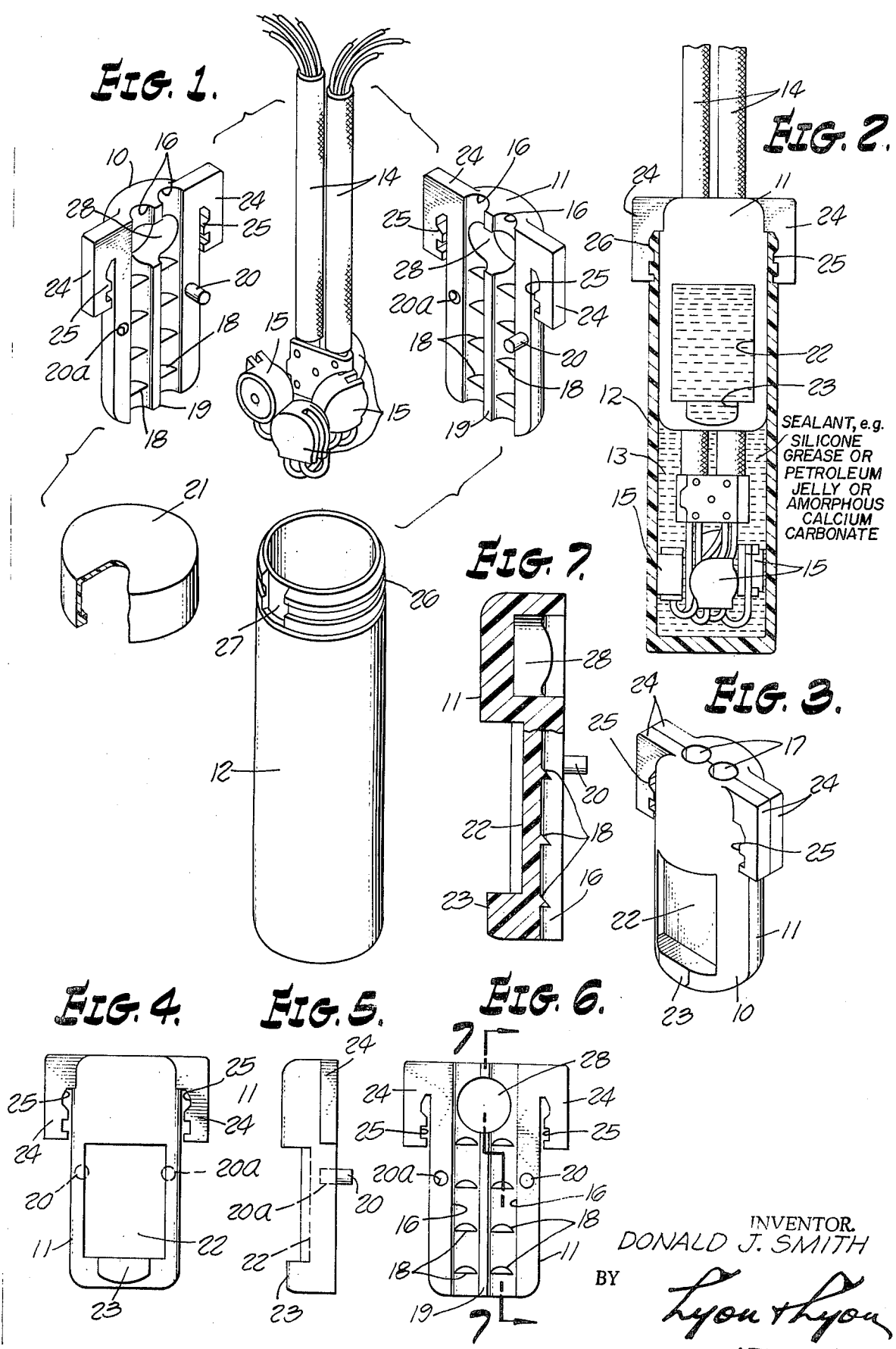

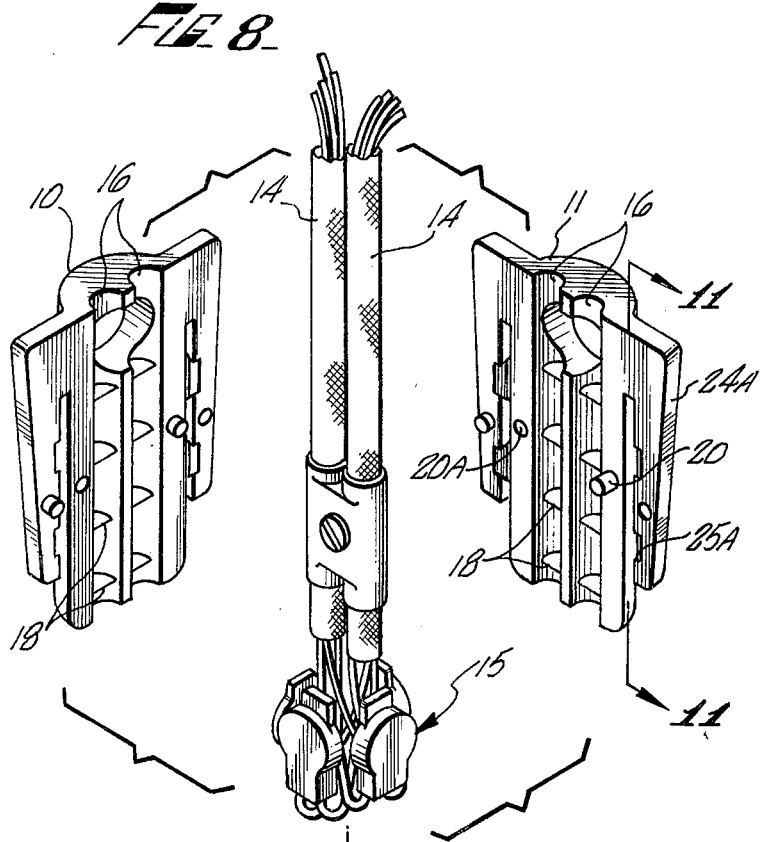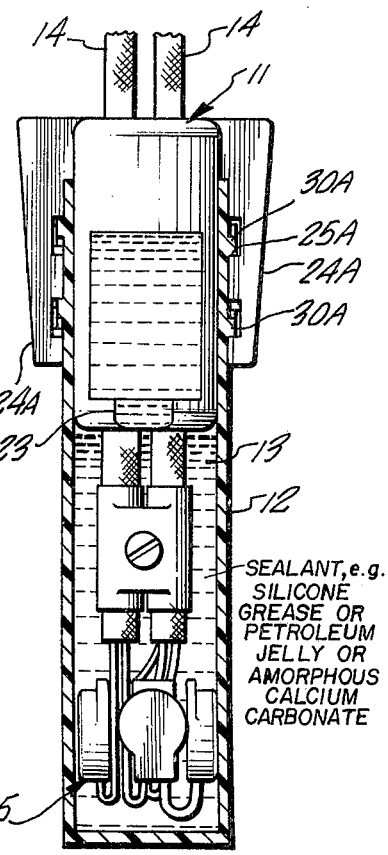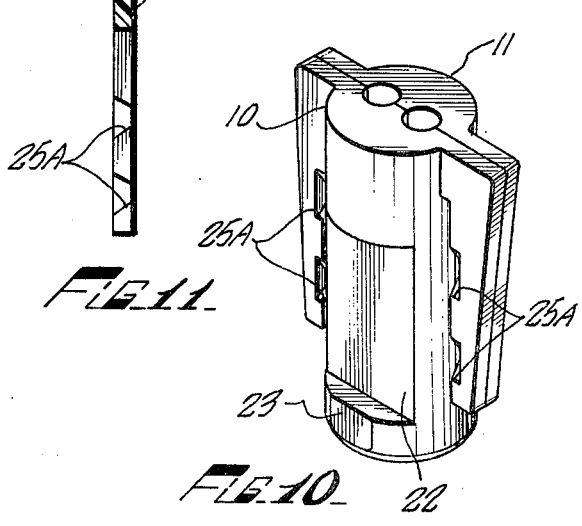

MOISTURE PROOF CABLE SPLICE ENCLOSURE

BACKGROUND OF THE INVENTION

This application is a continuation-in-part of my co-pending application Ser. No. 171,570 filed Aug. 13, 1971, now abandoned.

There are many instances where an electrical cable splice must be insulated and protected from the effects of the environment in which it is used. For example, in splicing a telephone service cable to the main cable, particularly in underground installations, protection must be afforded against the deleterious effects of moisture, not only on the electrical connection itself, but on the long lengths of the cable which the moisture may reach as a result of the effects of hydrostatic pressure and capillary action.

At present, a commonly used moisture-proof cable splice enclosure for this purpose requires the placing of the splice in a suitable container filled with activated resin. After setting, the hardened resin, combined with the container, provides a certain amount of structural rigidity and prevents moisture from reaching the splice and the exposed ends of the cables.

Several disadvantages of this technique are apparent and result primarily from the use of a sealing material which must be first activated and then cured to a hardened state. At the time of installation, the resin must be mixed with a catalytic compound, poured into the container and cured for some period of time. The mixing and pouring of the resin involves separate containers and mixers, the end result of which is a general clean-up problem. The installer must also take great care when mixing the resin and when immersing the splice and cables so as to prevent the entrapment of air in the mixture which later could provide a cavity for the transmission of water or significantly weaken the structural ability of the resin. Lastly, the resin requires time to cure or harden. This curing time is mandatory because of the exothermic nature of the reaction which, if allowed to occur too quickly, may cause heat damage to the splice or the resin. During this curing time, the splice and cables must be maintained in a fixed position so as to prevent the creation of gaps caused by the relative motion of the embedded items with respect to the partially set up resin.

SUMMARY OF THE INVENTION

According to the present invention, a moisture proof cable splice enclosure is provided which can be installed in a matter of seconds without any mixing procedure, curing time or mess. The invention also precludes the possibility of the assembler improperly mixing or curing the seal. These advantages are obtained by use of a vial which has been prefilled with a specific amount of sealant not miscible with water, and a plug which rigidly holds the cables in place and closes the open end of the vial. The cables, already spliced in a conventional manner, are positioned between mating halves of the plug with the splice and cable ends projecting beyond one end of the plug. The plug is then inserted into the vial with the splice, cable ends and part of the plug immersed in the sealant. The plug is preferably fabricated so as to cause the sealant displaced by the splice, cable ends and a portion of the plug to fill any voids between the plug, the walls of the vial, and the cables, and provide a highly efficient seal precluding the intrusion of moisture. The waterproofed splice and cable ends are then ready to be positioned in the ground or any other similar moist environment. The vial and plug configuration may also include means for mechanically forcing the plug assembly into the vial to aid the installer and allow the employment of more viscous sealants.

As can readily be seen, the present invention provides a quickly assembled, highly reliable, problem-free water-proof cable splice enclosure. Because the sealant is prepacked in the vial and in its final form, there is no mixing, filling or curing problem. No extra equipment is necessary to assemble the enclosure, and no time is wasted for the seal to cure or dry. Also, the number of operations required of the assembler is reduced which in turn reduces the probability of human error. Because the plug, rather than the sealant as in the case of a resin filled vial, supports all loads, there is less chance that a minor failure under load of the enclosure will cause the moisture proofing material to fil in its function. In addition, the splice can be removed if that should prove desirable. Since the sealant is of an inert nature, any leakage of the sealant from the enclosure is not likely to cause damage to the surroundings.

BRIEF DESCRIPTION OF THE DRAWINGS

FIG. 1 is an exploded perspective view of the moisture proof cable splice enclosure of the present invention with two cables spliced together;

FIG. 2 is an assembled view, partly in section, of the cable splice enclosure of the present invention;

FIG. 3 is a perspective view of the assembled plug used in the present invention;

FIG. 4 is a front elevation of one half of the plug;

FIG. 5 is a side elevation view of one half of the plug;

FIG. 6 is a rear elevation view of one half of the plug;

FIG. 7 is a cross-sectional view of one half of the plug taken along line 7—7 of FIG. 6.

FIG. 8 is an exploded perspective view of the moisture proof cable splice enclosure of the present invention illustrating the extended arms on the plug members and a set of threads on the vial.

FIG. 9 is an assembled view, partly in section, of the cable splice enclosure illustrating the means for forcing and retaining the plug assembly in the vial.

FIG. 10 is a perspective view of a plug as employed in FIG. 8 and FIG. 9.

FIG. 11 is a cross-sectional view taken along line 11—11 of FIG. 8.

DESCRIPTION OF THE INVENTION

The drawings illustrate the preferred embodiments of an enclosure according to the present invention. A plug constructed of two identical mating halves 10 and 11 is constructed to cooperate with a vial 12 and a sealant body 13 to protect a pair of cables 14 spliced together by conventional means 15. The sealant 13 is preferably a silicone grease or petroleum jelly, but may be any other suitable substance not miscible with water, and which does not set up but rather stays flowable for the normal life of the splice. It has also been found that an amorphous composition of calcium carbonate or powered chalk also is sufficiently non-miscible with moisture to be used as the sealant. Calcium carbonate compounded to provide optimum results is sold under the trade names Protex-E and Protexulant. The enclosure is assembled by first mating the plug halves 10 and 11 about the cables 14. To accommodate the cables 14, each plug half has two semi-circular grooves 16 formed in the mating surface of the plug half. When mated, the grooves 16 in the plug halves form cylindrical holes 17 through the body of the plug as shown in FIG. 3. The grooves are appropriately sized to accommodate and hold the cables and are fabricated such that they leave a central ridge 19 which serves to properly separate and space the cables 14. Teeth 18 are spaced along the semi-circular grooves 16 to grasp the cables and help retain them in proper position. To insure proper assembling of the mated plug halves, each half has a pin 20 and a guide hole 20a which when engaged, cause the plug halves to be aligned.

After assembling the plug halves 10 and 11 around the cables 14 and splice 15, the plug is inserted into the vial 12. The vial has been prefilled with a sealant body 13 which has been protected with a temporary cap 21 that is discarded when the enclosure is assembled. The insertion of the assembled plug into the vial 12 displaces the sealant 13 and causes it to flow around the plug and into the holes 17. The plug halves 10 and 11 are preferably provided with recesses 22 which form reservoirs for the displaced sealant when the plug is inserted into the vial 12. Communication between these recesses and the interior of the vial is established by forming a relief 23 at the base of each of the semicircular bodies of the plug halves 10 and 11.

The plug is held in the vial in the embodiment illustrated in FIGS. 1 through 7 by arms 24 which have teeth 25 formed on depending portions of the arms and which snap over and grasp ridges 26 provided on the outer surface of the upper end of the vial 12. If desired, an interruption in the ridges 26 can be provided to establish a non-ridged surface 27 to permit easy disassembly of the plug from the vial upon rotation of the plug.

If desired the arms 24 may be provided with means for grasping the vial 12 before the plug has been fully inserted into the vial 12. In combination with the vial 12, these means can then provide mechanical leverage to draw the plug toward the fully closed position in the vial 12. One device for accomplishing this grasping and drawing assembly function is shown in FIGS. 8 through 11. Arms 22A are extended along a substantial portion of the length of the plug in order that the arms 24A may reach the upper edge of the vial 12 before substantial resistance is encountered from the sealant body 13 as it is displaced by the entering plug during assembly. Teeth 25A are provided on the inner side of the extended arms 24A. The teeth 25A are designed to act in cooperation with a number of threads 30A located on vial 12. To provide cooperation between the threads 30A and the extended arms 24A, it is advantageous to have the same number of threads 30A as there are arms 24A. In this way, the lower most tooth 25A on each arm 24A will engage a thread 30A simultaneously as the plug is positioned on the vial 12. This configuration is advantageous because it creates equal drawing forces on each arm 24A as the plug is drawn into the vial 12. As the plug is drawn into the vial 12, the sealant body 13 is forced upward about the plug to fill all cavities and passage ways into which moisture might intrude. Because of the mechanical drawing action of the grasping means, the assembly operation is facilitated and more viscous material may be used as a sealant body 13.

With the plug assembly fully inserted into the vial 12 assembly of the enclosure is complete. The plug halves 10 and 11 are held together by the wall of the vial 12. By engulfing the splice and by filling the gaps between the plug halves and the vial, the sealant provides an effective waterproof seal. As soon as the plug assembly has been positioned in the vial, the entire enclosure is ready to be placed in the ground or other similar moist environment. A suitable sealant material, one having a petroleum base with no melted polyethylene, is sold commercially under the trade name JEL-PAK by G.F.C. Engineering and Sales Corporation of Los Angeles, California. Another type of suitable sealant material coming into wide spread use for sealing electrical splices is non-miscible powder.

The plug halves and vial can most conveniently be molded or formed in plastic. The chamber 28 in the plug halves 10 and 11 is there to simplify the molding operation and does not serve any other functional purpose.

While the invention has been discussed in connection with telephone cables, it is to be understood that it has utility in many other applications and with cables of other sizes. The invention is also useful for enclosing splices where more than two cables are involved. The embodiment described above is therefore not to be taken as limiting the scope of the invention, but rather as illustrative of its nature.

What is claimed is:

1. An enclosure for moisture proofing cable splices and cable ends associated therewith, comprising:
    a vial, said vial having a mouth and an interior volume for accepting the cable splice;
    a body of sealant contained in said vial for receiving the cable splice and the ends of the cables positioned in said vial;
    a plug having means for accepting and rigidly fixing a plurality of cables relative to said plug in the immediate proximity for the cable splice, said plug fitting within and closing the mouth of said vial, said plug having a body capable of extending into said body of sealant thereby forcing said body of sealant to deform around said plug and cable ends to fill all passages leading from the enclosure, said plug comprising a plurality of mating elements positioned about said cables, said mating elements being provided with means for securely grasping said vial and said vial being provided with at least one circumferential ridge for cooperating with said grasping means of said mating elements.

2. The enclosure of claim 1 wherein said grasping means of said mating elements comprise arms extending therefrom, said arms having teeth for cooperating with said circumferential ridge of said vial.

3. An enclosure for moisture proofing a cable splice comprising:
    a plug, said plug comprising a pair of mating elements positionable about said cables and having central grooves for receiving said cables, each of said mating elements having a pair of extending arms having teeth thereon, each of said mating elements further having a recess formed therein;
    a vial adapted to receive said plug for closure of said vial, said vial being of sufficient size to accept said cable splice and having at least one circumferential ridge for cooperating with said teeth of said mating elements and retaining said plug in said vial; and
    a body of sealant contained in said vial for receiving said splice and the ends of said cables when they are positioned in said vial, said sealant being flowable and not miscible with water.

4. A plug element for use in a cable splice enclosure, comprising:
- a body portion having a plurality of central grooves formed therein for receiving cables, said grooves being separated by a ridge, said body portion further having a recess formed therein in a portion remote from said central groove;
- a pair of arms extending outwardly from said body portion, each of said arms having a depending portion bearing a plurality of teeth directed toward said body portion; and
- means on said body portion for aligning said element with a mating element.

5. An enclosure for moisture proofing a cable splice comprising:
- a plug having means for accepting and rigidly fixing a plurality of cables relative to said plug in the immediate proximity of the cable splice;
- a vial adapted to receive said plug for closure of said vial, said vial being of sufficient size to accept the cable splice;
- a body of sealant contained in said vial for receiving the cable splice and the ends of the cable;
- threads located on said vial; and
- grasping means positioned on said plug for receiving said threads with the plug not fully closing said vial, said grasping means being capable of drawing said plug forcibly into said vial to fully close said vial and force said sealant body upward about said plug.

6. The device of claim 5 wherein said plug comprises a plurality of mating elements positionable about said cables.

7. The enclosure of claim 6 wherein said grasping means are located on each of said mating elements.

8. The enclosure of claim 6 wherein said mating elements are provided with recesses for receiving sealant displaced by immersion of said splice thereinto.

9. The enclosure of claim 6 wherein said mating elements are held in mated relationship by said vial.

10. The enclosure of claim 5 wherein said threads are equal in number to said grasping means.

11. The enclosure of claim 5 wherein said grasping means comprise arms extending from said plug, said arms having teeth for cooperating with said threads on said vial.

* * * * *